April 5, 1960 S. J. KRULIK 2,931,870
ELECTRIC ROTATING CIRCUIT BREAKER
Filed Nov. 19, 1958 2 Sheets-Sheet 1

Stefan J. Krulik
INVENTOR.

BY *Clarence A. O'Brien*
*and Harvey B. Jacobson*
Attorneys

April 5, 1960 S. J. KRULIK 2,931,870
ELECTRIC ROTATING CIRCUIT BREAKER
Filed Nov. 19, 1958 2 Sheets-Sheet 2

Stefan J. Krulik
INVENTOR.

BY *Clarence A. O'Brien*
*and Harvey B. Jacobson*
Attorneys

United States Patent Office 2,931,870
Patented Apr. 5, 1960

2,931,870
ELECTRIC ROTATING CIRCUIT BREAKER
Stefan J. Krulik, Newark, N.J.
Application November 19, 1958, Serial No. 774,948
6 Claims. (Cl. 200—80)

This invention relates generally to electric circuit breaker equipment and more particularly to an electric circuit breaker to be employed with rotating electrical equipment wherein centrifugal force is utilized to open an electrical circuit at a desired speed of rotation.

It is well known to one skilled in the art that uses for rotating electric circuit breakers are innumerable. It is further well-known to one skilled in the art that many devices have been developed in the past for breaking electrical circuits utilizing the centrifugal force derived from a rotating body. However, of all the devices known to the art at the present time, all are inadequate for use with miniature motors. Further, the circuit breakers known at this time often increase the inertia of a rotating shaft to such an extent as to make them impractical. Further, the devices known often have low limiting current values and so require special auxiliary relays.

Accordingly, it is the principal object of this invention to provide a simple centrifugal circuit breaker utilizing the minimum amount of parts.

It is a further object of this invention to provide a novel centrifugal circuit breaker which employs a portion of the mechanical system as part of the electrical circuitry.

It is more particularly an object of this invention to provide a simple D.C. motor control that may be easily mounted within a motor housing and which only insignificantly changes the motor rotor inertia.

It is a further particular object of this invention to provide a novel centrifugal circuit breaker which is capable of handling substantially an unlimited current.

It is a still further object of this invention to provide a centrifugal circuit breaker which is simple, reliable, and inexpensive and which may be utilized with a variety of systems for reliably opening an electrical circuit at a desired condition.

In accordance with the above stated objects, below is particularly described the structure and circuitry of the novel rotating electrical circuit breaker comprising this invention along with a description of various applications of the device. In combination with a motor housing completely enclosing a motor having a rotating shaft, the electric circuit breaker initially includes an insulative disk-shaped housing fitted on the shaft. The fit may be a forced fit. The shaft extends through the center of the disk so that the insulative disk will not dynamically unbalance the shaft. Further, it is contemplated that the insulative disk be constructed of a light material so as not to substantially change the inertia of the motor. At least one cylindrical cavity extends from the outer diameter of the insulative disk along a radius thereof. A pair of electric terminals are carried in the cavity but are spaced from each other. Each of the terminals extends externally of the housing. The cavity is internally threaded adjacent the outer circumference of the disk-shaped housing and an externally threaded cavity closure member is carried in the cavity threadedly engaged therein. The closure member electrically contacts one of the terminals. A conductive spring is carried in said cavity adjacent the closure member while a conductive ball is carried in the cavity adjacent the spring. The spring is therefore sandwiched somewhat between the conductive ball and closure member. The spring therefore is in a position to resiliently urge the conductive ball into contact with the other of said terminals for effectively electrically bridging the terminals under normal standstill conditions. Upon rotation of the shaft, the ball is carried outwardly from the shaft in the cavity by centrifugal force, compressing the spring, and therefore electrically disconnecting the terminals. The threaded engagement between the closure member and the cavity allows for a selective adjustment of the opening point of the terminals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
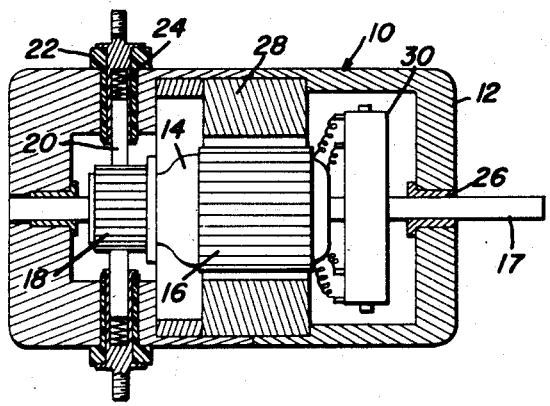
Figure 1 is a sectional view of a D.C. motor utilizing the present invention.
Figure 4:
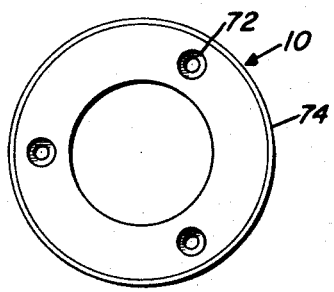
Figure 4 is an elevational view of an adapter to be utilized in combination with the electrical circuit breaker in certain applications.

With continuing reference to the drawing and initial reference to Figure 1, numeral 10 generally represents a direct current motor of substantially standard design including a housing 12 completely enclosing the electric components to prevent explosion and comply with underwriters specifications. The housing 12 encloses a motor 14 including an armature, core, and shaft assembly 16. A commutator 18 is utilized to electrically contact brushes 20 insulated from the housing 12 by sleeves 22. Springs 24 assures good electrical contact between brushes 20 and commutators segments 18. Bearings 26 are fitted in the housing 12 to allow the shaft 17 to easily rotate. The permanent magnet assembly 28 of course is located proximate the armature assembly across a gap to establish the right flux pattern therein. The circuit breaker 30 comprising this invention is pressed onto the shaft 17 within the housing 12 adjacent the assembly 16. The circuit breaker 30 includes a disk shaped housing 32 of insulative material as plastic having light weight so as to substantially not change the inertia of the shaft 17. A cylindrical cavity 34 is constructed in the housing 32 and extends from the outer circumference along a radial line toward the shaft 17. The cavity 34 is internally threaded as at 36 and threadedly accommodates a closure member 38 which is externally threaded. A spring 40 bears against the closure member 38 and is sandwiched between the closure member 38 and a conductive ball 42. A first terminal 44 extends from the cylindrical cavity 34 externally of the housing 32. A second terminal 46 is positioned in electrical contact with the closure member 38 adjacent the outer circumference of the disk-shaped housing 32. When the circuit breaker 30 and shaft 17 are at a standstill, the spring 40 resiliently urges the ball 42 into electrical contact with terminal 40 thereby bridging the gap between terminals 44 and 46 through conductive closure member 38, conductive spring 40, and conductive ball 42. Of course, any conductive materials may be utilized for these elements but experience has taught that the contact ball 42 should preferably be nickel plate with rhodium coating to improve efficiency whenever a low resistance, long wearing oxide free contact is required. The rhodium plate assures low noise level for the moving contact, no oxide rectification, and low and stable contact resistance. It is further noted that when the ball contact is operating in the electrical circuit as a contact, it will rotate and thus the contact area may be considered as the outside area of the sphere.

The disk shaped housing 32 carries at the center thereof a knurled bushing 48 for assuring a proper fitted engagement with the shaft 17. Further, apertures 60 which are internally threaded are provided on the face of the housing 32 to accommodate an adapter to be later discussed.

Figure 7:
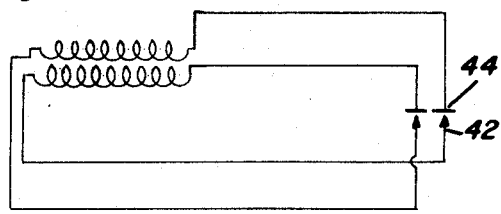
Figure 7 is a schematic circuit diagram corresponding to the motor of Figure 1.

Noting Figure 7, corresponding to Figure 1, the contact 42 and 44 comprising the movable ball contact and the stationary contact are illustrated in the wound rotor circuit. As the shaft 17 rotates the ball contact 42 is thrown outwardly by centrifugal force and at a certain speed of the shaft 17, electrical contact between ball contact 42 and terminal 44 will be broken. Of course, this point of opening of the circuit may be varied by the spring compression determined by the threaded closure member 38. It is apparent therefore, that the circuit breaker may be utilized with the direct current motor within the motor housing so that the direct current motor will remain explosion proof and corrosion on electrical parts will be considerably reduced. It is further apparent that utilization of the circuit breakers acts as a speed control or governor for the rotating direct current machinery.

Figure 2:
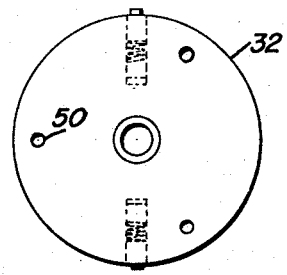
Figure 2 is an elevational front view of the circuit breaker comprising this invention.
Figure 3:
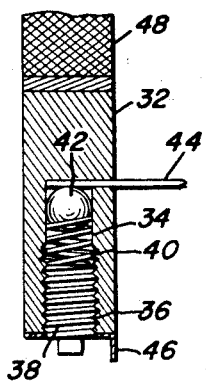
Figure 3 is a fragmentary sectional view illustrating the cavity, terminals, and bridging means.
Figure 5:
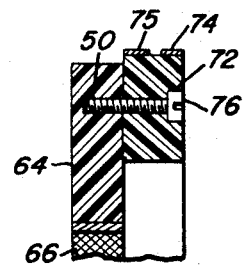
Figure 5 is a sectional fragmentary view illustrating a preferred method of coupling the adapter to the circuit breaker housing.
Figure 6:
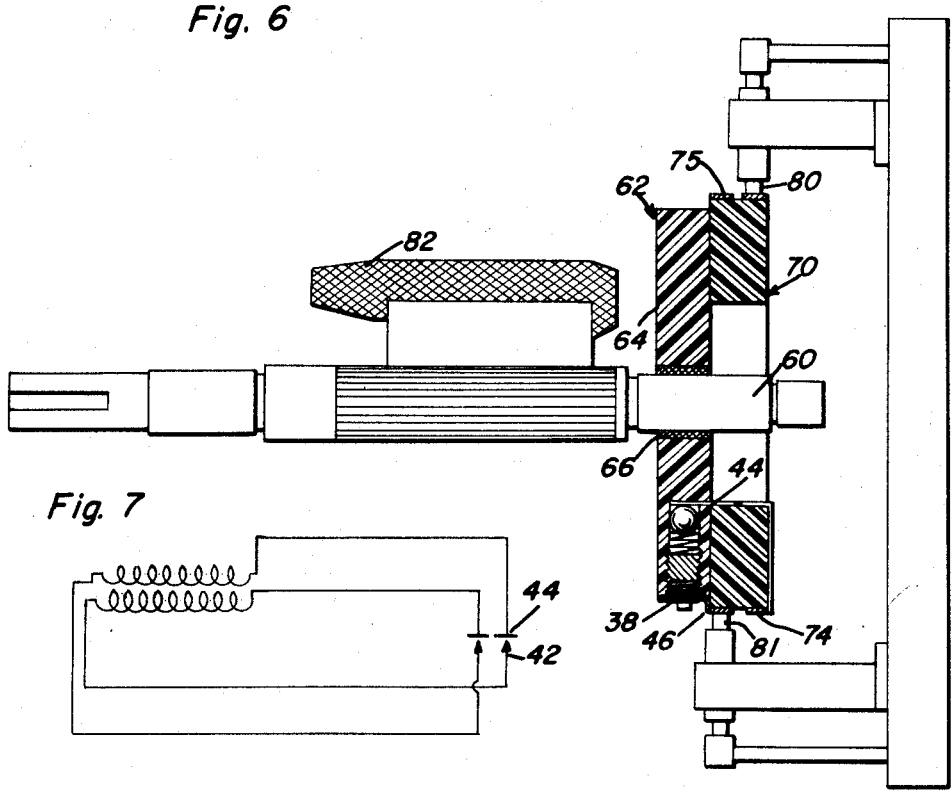
Figure 6 is a partial sectional view of alternating current motor illustrating one application of the circuit breaker and adapter.

Referring now to the alternating current motor of Figure 6, wherein the teachings of this invention are utilized to include a capacitor in a phase winding for starting, numeral 60 represents the rotating shaft carrying the circuit breaker 62 comprising a disk-shaped insulative housing 64 having a knurled center bushing 66 for maintaining the circuit breaker 62 on the shaft 60. When it is necessary to utilize an adapter, an adapter 70, also a dish-shaped insulative member having countersunk apertures 72 and a pair of copper strips 74 and 75 forming conductive rings fastened to the circumference of the disk 70, may be employed. Screws 76 pass through the countersunk apertures 72 and communicate with the apertures 50 in the insulative disk-shaped housing noted above in Figure 2. The copper rings 74 and 75 are electrically connected to the terminals 44 and 46 respectively. A brush assembly 80 is adapted to be in contact with the copper ring 74 while the brush assembly 81 is adapted to contact the ring 75 for providing electrical energy through the circuit breaker to a particular phase of the motor windings 82. The adapter illustrated is generally utilized with the conventional type of brush rocker rings, commonly industrially used.

Figure 8:
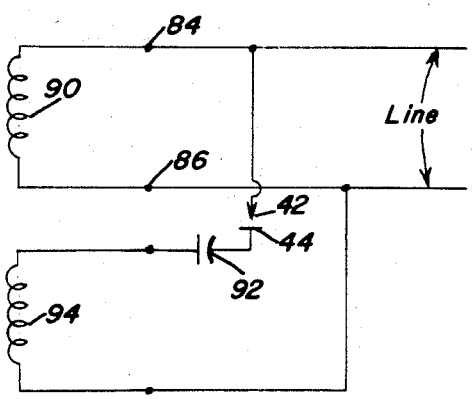
Figure 8 is a schematic diagram showing possible connections of the coils of Figure 6.
Figure 9:
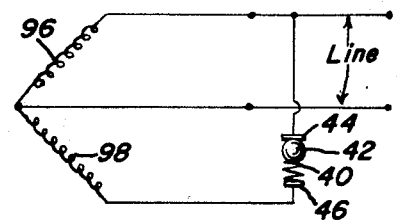
Figure 9 is an alternate form of Figure 8.

The schematic diagrams of Figures 8 and 9 correspond to the structural features illustrated in Figure 6. Figure 8 illustrates the wiring diagram for an alternating current capacitor starting motor wherein a line voltage is impressed across the terminals 84 and 86 to the main phase winding 90. The contacts 42 and 44 are serially connected with capacitor 92 and with an anxiliary phase winding 94 across the line for providing an intial out of phase voltage to induce an intial starting torque. At approximately 75% full load speed, the circuit breaker opens deenergizing the auxiliary winding 94.

Figure 9 illustrates a wiring set-up very similar to Figure 8 wherein a main phase winding 96 and an auxiliary phase winding 98 are initially utilized to develop a starting torque. The auxiliary phase winding 98 is open circuited when the motor reaches the desired speed. Any means well-known in the art for shifting phase may be utilized.

In the circuits of Figures 8 and 9 incorporating the structure of Figure 6, the brush assembly 81 is electrically connected to the line and thence through the ring 75, through the terminal 46, closure member 38, spring 40, ball 42, contact 44, ring 74, brush assembly 80 and back to the other side of the line. As shown particularly in Figure 8, a capacitor as at 92 may be incorporated in the circuit so as to shift the phase.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A novel electric circuit breaker for use with equipment having a rotating shaft comprising a housing, said housing carried by said shaft, a pair of spaced terminals in said housing, a cavity in said housing extending between said terminals, and speed responsive bridging means carried in said cavity for electrically bridging said terminals, said housing cavity being cylindrical and terminally internally threaded, an externally threaded cavity closure member adjustably threadedly engaged in said cavity.

2. A novel electric circuit breaker for use with equipment having a rotating shaft comprising a housing, said housing carried by said shaft, a pair of spaced terminals in said housing, a cavity in said housing extending between said terminals, and speed responsive bridging means carried in said cavity for electrically bridging said terminals, said speed responsive bridging means including a conductive spring, a conductive ball and an adjustable cavity closure member, said spring resiliently urging said ball into contact with one of said terminals, said closure member being in contact with the other of said terminals.

3. The combination of claim 2 wherein said housing cavity is cylindrical and terminally internally threaded, said cavity closure is externally threaded and adjustably threadedly engaged in said cavity.

4. In combination with a motor housing enclosing a motor having a rotating shaft, an electric circuit breaker comprising an insulative housing fixed to said shaft, a cavity in said housing, a pair of electrical terminals carried in said cavity but spaced from each other, each of said terminals extending externally of said housing, and speed responsive bridging means carried in said cavity for electrically bridging said terminals, said housing cavity being cylindrical and terminally internally threaded, an externally threaded cavity closure member adjustably threadedly engaged in said cavity.

5. In combination with a motor housing completely enclosing a motor having a rotating shaft, an electric circuit breaker comprising an insulative disk-shaped housing, said insulative housing fixed on said shaft with said shaft extending through the center of said disk, at least one cylindrical cavity in said insulative housing extending along a radius thereof, a pair of electric terminals carried in said cavity but spaced from each other, each of said terminals extending externally of said housing, said cavity terminally internally threaded, an externally threaded cavity closure member carried in said cavity electrically in contact with one of said terminals, a conductive spring in said cavity adjacent said closure member, a conductive ball in said cavity adjacent said spring whereby said spring may resiliently urge said ball in contact with the other of said terminals.

6. The combination of claim 5 wherein an adapter is carried on the shaft adjacent said insulative housing, said adapter comprising an insulative disk, a pair of raised conductive rings carried on the outer surface of said adapter disk, a first of said rings electrically connected to one of said terminals, a second of said rings electrically connected to a second of said terminals, said rings adapted to be in electrical contact with brushes.

References Cited in the file of this patent

UNITED STATES PATENTS

| | | |
|---|---|---|
| 2,804,515 | Heggen | Aug. 27, 1957 |
| 2,868,916 | Neuworth et al. | Jan. 13, 1959 |